Oct. 11, 1960 A. HEINZ 2,955,510
MOTION PICTURE CAMERA WITH SLIDING SHUTTER
AND DEVICE FOR BACKWINDING OF THE FILM
Filed March 17, 1958
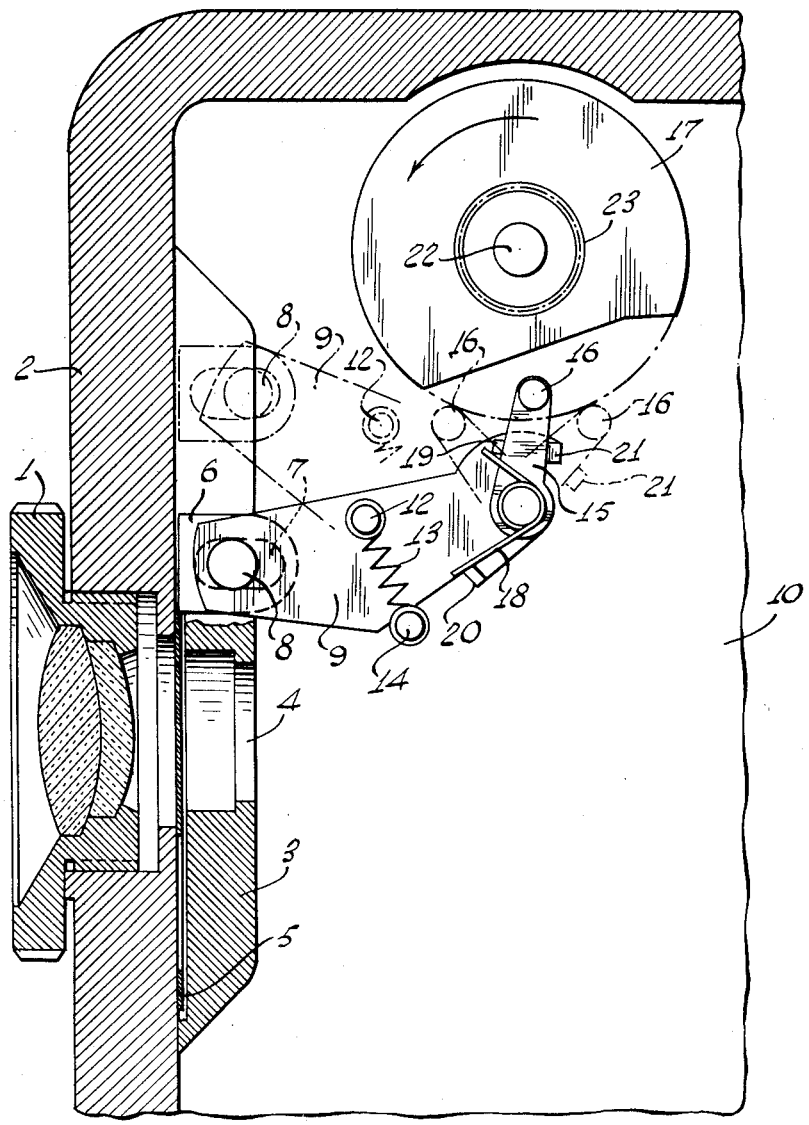
INVENTOR
ALEXANDER HEINZ
BY
ATTORNEY

United States Patent Office 2,955,510
Patented Oct. 11, 1960

2,955,510

MOTION PICTURE CAMERA WITH SLIDING SHUTTER AND DEVICE FOR BACKWINDING OF THE FILM

Alexander Heinz, Dresden, Germany, assignor to VEB Kamera-und Kinowerke Dresden

Filed Mar. 17, 1958, Ser. No. 721,722

Claims priority, application Germany June 12, 1957

3 Claims. (Cl. 88—17)

This invention relates to a motion picture camera with sliding shutter and having a device for backwinding of the film, and more particularly, to a motion picture camera having a shutter actuating device for actuating the shutter during forward transport of the film, while retaining the shutter in closed position during backwinding of the film.

In order to be able to make fade-ins and fade-outs or double exposures with motion picture cameras, the film must be moved backwards a corresponding number of frames. Particularly in the case of simple moving picture cameras which are generally equipped with sliding shutters, the fade-in and the fade-out is effected by means of an iris diaphragm installed in the objective during the fade-in or out process. Since most iris diaphragms are not adjustable to a completely light tight condition and retain a slight opening while in their closed position, the lens must be manually covered during the backwinding of the film. However, this precautionary covering of the lens is frequently forgotten by the photographer so that undesirable light passes through the lens aperture to expose the film during its backward movement.

In accordance with the present invention that there is employed, as the drive of a sliding shutter, a cam mechanism having a free wheeling and interlocking device which acts in a manner such that during the advance of the film and camera mechanism, the shutter moves between its opened and closed positions, while during reversal, it remains in its closed position.

In one embodiment of the invention, the free wheeling and interlocking device comprises a flat bar which carries the sliding shutter and in rest position is pressed by spring force against a stationary stop. An arm rotatably supported on the flat bar and actuated by a cam is pressed by spring force against a stop arranged on the flat bar during forward operation of the mechanism and is moved away from said stop on the flat bar upon rearward operation of the mechanism, the sliding shutter remaining in the closed position during the rearward operation.

It is, therefore, an object of the present invention to provide means for preventing light from striking motion picture film during the backwinding of the film.

It is a further object of the invention to provide means for facilitating the shooting of fade-ins and fade-outs and double exposures in taking moving pictures, without the necessity of the motion picture operator separately covering the lens aperture.

Another object of the invention is the provision of a device which retains a moving picture camera shutter in closed position during backwinding of the film.

Other objects and many of the attendant advantages of this invention will readily be appreciated as the same becomes better understood by reference to the following detailed description when considered in connection with the accompanying drawing wherein:

The figure is a vertical section through a motion picture camera provided with one embodiment of the device of the present invention, only the parts of the camera necessary for the description and understanding of the present invention being shown.

Referring now to the drawing, there is shown in the figure the front wall 2 of a camera housing in which is carried the objective 1. A guide strip 3 in which the light aperture 4 is located is positioned adjacent the front wall 2. Between wall 2 and the guide strip 3 there is supported a sliding shutter 5 having an extension 6 which projects at right angles therefrom. In the extension 6 is provided a slot 7 which serves as a guide for a pin 8 fixedly attached to a flat bar 9. The flat bar 9 is swingable about a supporting pivot or pin 11 fastened to the camera wall 10. A spring 13, connected at one end by means of a pin 12 to the flat bar 9 urges the latter against a fixed stop 14 fastened to the camera wall 10. The stop 14 also serves simultaneously as a fastening point for the other end of spring 13.

Against the flat bar 9 and about the pivot pin 11 there is rotatably supported an arm 15 on the free end of which is a pin or cam follower 16 which projects into the field of action of a cam 17. By means of a spring 18, one end of which rests against a projection 19 on the arm 15 and the other end of which rests against the projection 20 on the flat bar 9, the arm 15 is urged in clockwise direction against a stop or lug 21 fixedly attached to the flat bar 9.

The cam 17 is adjustably fixed to the shaft 22 which carries a gear 23 connected, in a manner not shown in the drawing, to the camera transport mechanism. In order to effect an adjustment of the raised position of the shutter with respect to the position of the film transport mechanism, the cam is appropriately fastened in such a manner on shaft 22 that its position with respect to the shaft can be adjusted.

The manner of operation of the apparatus is as follows:

When the cam 17 is turned in the counter-clockwise direction as indicated in the figure by the arrow (forward transport of the film), the arm 15 will be swung in a clockwise direction into the right-hand position indicated by the first dotted lines in the drawing, against stop 21 to swing flat bar 9 clockwise and thus raise shutter 5. After approximately one revolution of the cam 17, arm 15 and plate 9 with shutter 5 attached thereto will be returned to their original position by the tension of spring 13 acting on the flat bar 9. In this manner, an upward and downward movement of the sliding shutter 5 with the resultant exposure and covering of aperture 4 is periodically effected as cam 17 rotates. When the direction of rotation of the camera mechanism is reversed in order to wind the film backward, the rotation of the cam 17 changes to a clockwise direction. Arm 15 is then swung in counter-clockwise direction by cam 17 and is moved away from the stop or lug 21 on the flat bar 9, overcoming the force of spring 18. Arm 15 finally passes into the left-hand position indicated by the other dotted lines in the drawing.

During this reverse rotation of the camera mechanism, there is no movement of the sliding shutter 5, and the latter remains positively in the position in which it closes the lens aperture.

By a suitable arrangement of levers, the present device may be adapted to other types of shutters as well, for example to tilting or rotary-blade shutters.

Obviously, many modifications and variations of the present invention are possible in the light of the above teachings. It is, therefore, to be understood, that within the scope of the appended claims, the invention may be practiced otherwise than specifically described.

Having thus described the invention, what is claimed and desired to be protected by Letters Patent of the United States is:

1. In a motion picture camera having a guided slidable shutter over a light aperture and a film transport device for moving the film backwards as well as forward, means for driving said shutter comprising a cam mechanism, and free wheeling and interlocking means for actuation of said shutter only during the forward travel of the film; whereby upon forward travel of the camera film transport device the shutter periodically covers and uncovers the light aperture, while upon rearward travel, the shutter is positively retained by the free wheeling and interlocking means in a position in which said shutter covers said aperture; said free wheeling and interlocking means including a rotatably supported flat bar operably connected to said shutter, a stationary stop, biasing means for urging said flat bar in rest position against said stop, an arm rotatably supported against said flat bar, a cam operably connected to said film transport device, a lug fixedly attached to said flat bar for engagement with said arm, and a spring bar biasing said arm against said lug whereby upon forward travel of the camera film transport device, said arm is pressed by said cam against said lug on said flat bar to swing said flat bar and actuate said shutter attached thereto, and whereby upon rearward travel of said film transport device, said arm is swung away from said lug on said bar and said sliding shutter is urged into its closed position by said biasing means and said spring.

2. Free wheeling and interlocking means according to claim 1, said arm and said flat bar being rotatably supported about identical pivots.

3. In a motion picture camera having a housing adapted to hold film, an objective lens mounted in said housing, a shutter slidably mounted in said housing adjacent said objective lens for transition from a covering position overlying said objective lens to an uncovering position, biasing means in said housing adapted to move said shutter toward said covering position, stop means in said housing for limiting the movement of said shutter into said covering position, a reversible film transport device for forward and backward movement of film, reversible cam means mounted on said housing and connected to said film transport device for rotation thereby, cam follower means in said housing movable by said cam between a neutral position and a first position by forward motion of said cam means and between the neutral and a second position by reverse movement of said cam means, said cam follower means engaging said biasing means during movement from the neutral to the first position and moving said shutter into the uncovering position, and resilient means biasing said cam follower means into the neutral position.

References Cited in the file of this patent

UNITED STATES PATENTS

| | | |
|---|---|---|
| 1,143,977 | Kucharski | June 22, 1915 |
| 1,309,798 | Folmer | July 15, 1919 |
| 1,349,650 | Bancarel | Aug. 17, 1920 |
| 1,469,016 | King | Sept. 25, 1923 |
| 2,117,694 | Becker | May 17, 1938 |

FOREIGN PATENTS

| | | |
|---|---|---|
| 20,191 | Great Britain | of 1908 |